(12) United States Patent
Chu et al.

(10) Patent No.: US 9,077,579 B1
(45) Date of Patent: Jul. 7, 2015

(54) SYSTEMS AND METHODS FOR FACILITATING ACCESS TO SHARED RESOURCES WITHIN COMPUTER CLUSTERS

(75) Inventors: Jiang-Hsing Chu, San Jose, CA (US); Shailesh Marathe, Maharashtra (IN); Niranjan Pendharkar, NCL/Pasan (IN)

(73) Assignee: Symantec Corporation, Mountain View, CA (US)

( * ) Notice: Subject to any disclaimer, the term of this patent is extended or adjusted under 35 U.S.C. 154(b) by 748 days.

(21) Appl. No.: 13/397,255

(22) Filed: Feb. 15, 2012

(51) Int. Cl.
  *G06F 15/173* (2006.01)
  *H04L 29/06* (2006.01)
(52) U.S. Cl.
  CPC ....................................... *H04L 29/06* (2013.01)
(58) Field of Classification Search
  CPC .............. H04L 29/12066; H04L 63/20; H04L 67/1097
  USPC ......................................................... 709/226
  See application file for complete search history.

(56) References Cited

U.S. PATENT DOCUMENTS

| | | | | |
|---|---|---|---|---|
| 7,398,323 B1 * | 7/2008 | Gerraty et al. | ................ | 709/242 |
| 7,617,369 B1 * | 11/2009 | Bezbaruah et al. | ........... | 711/162 |
| 7,657,578 B1 * | 2/2010 | Karr et al. | ..................... | 707/610 |

* cited by examiner

*Primary Examiner* — Hua Fan
(74) *Attorney, Agent, or Firm* — ALG Intellectual Property, LLC

(57) ABSTRACT

A computer-implemented method for facilitating access to shared resources within computer clusters may include (1) identifying a computer cluster, (2) identifying at least one node within the computer cluster that has been selected to execute an application, (3) identifying at least one different node within the computer cluster that has not yet been selected to execute the application, (4) importing a read-write configuration of at least one shared resource to the node, (5) importing a read-only configuration of the shared resource to the different node, (6) determining, after importing the read-only configuration of the shared resource to the different node, that the different node has been selected to execute the application, and then (7) converting, in response to this determination, the different node's read-only configuration of the shared resource to the read-write configuration of the shared resource. Various other systems, methods, and computer-readable media are also disclosed.

20 Claims, 6 Drawing Sheets

Read-Write Configuration
122

Cluster Configuration: HIGH AVAILABILITY

Nodes Included in Computer Cluster: NODES 202(1)-(N)

Application Running on Cluster: APPLICATION 1

Node Currently Executing Application: NODE 202(1)

Shared Resource(s) Used by Application: SHARED RESOURCES 210(1)-(N)

Accessibility to Shared Resource(s): READ/WRITE

---

Read-Only Configuration
124

Cluster Configuration: HIGH AVAILABILITY

Nodes Included in Computer Cluster: NODES 202(1)-(N)

Application Running on Cluster: APPLICATION 1

Node Currently Executing Application: NODE 202(1)

Shared Resource(s) Used by Application: SHARED RESOURCES 210(1)-(N)

Accessibility to Shared Resource(s): READ ONLY

*FIG. 4*

SYSTEMS AND METHODS FOR FACILITATING ACCESS TO SHARED RESOURCES WITHIN COMPUTER CLUSTERS

BACKGROUND

In a high-availability configuration, a computer cluster may include multiple nodes configured to provide high availability of at least one application. Such a configuration may be implemented in an effort to ensure that at least one node within the computer cluster is capable of executing the application at any given time. For example, cluster software installed on the computer cluster may select a particular node to execute the application and then determine at a later point in time that the node is no longer healthy enough to continue executing the application. In this example, upon determining that the node is no longer healthy enough to continue executing the application, the cluster software may direct the application to fail over from the unhealthy node to a different node (often referred to as the failover node) within the computer cluster.

In order to function properly, the application may need to access data stored in one or more resources (such as one or more disk storage devices) shared by the nodes within the computer cluster. However, the cluster software may limit access to such resources in an effort to avoid a "split-brain" scenario and/or data corruption. For example, the cluster software may prevent the failover node from importing a configuration of the resources needed to execute the application until the application has failed over from the unhealthy node to the failover node. Unfortunately, this process of importing the configuration to the failover node may take several minutes, potentially leading to application downtime and/or customer dissatisfaction.

As such, the instant disclosure identifies a need for systems and methods for efficiently and effectively facilitating access to shared resources within computer clusters to eliminate (or at least further reduce) application downtime.

SUMMARY

As will be described in greater detail below, the instant disclosure generally relates to systems and methods for facilitating access to shared resources within computer clusters to eliminate (or at least further reduce) application downtime. In one example, a computer-implemented method for accomplishing such a task may include (1) identifying a computer cluster that includes (a) a plurality of nodes configured to provide substantially continuous availability of at least one application and (b) at least one shared resource configured to store data associated with the application, (2) identifying at least one node that has been selected to execute the application, (3) identifying at least one different node that has not yet been selected to execute the application, (4) importing a read-write configuration of the shared resource to the node selected to execute the application to enable the node to read from and write to the shared resource, (5) importing a read-only configuration of the shared resource to the different node to enable the different node to read from but not write to the shared resource, (6) determining, after importing the read-only configuration of the shared resource to the different node, that the different node has been selected to execute the application, and then (7) converting, in response to this determination, the different node's read-only configuration of the shared resource to the read-write configuration of the shared resource instead of importing the read-write configuration to the different node after the different node has been selected to execute the application.

In some examples, the method may also include receiving a notification indicating that the node previously selected to execute the application has started updating the read-write configuration of the shared resource. In such examples, the method may further include invalidating the different node's read-only configuration of the shared resource in response to receiving the notification. In addition, the method may include removing the read-only configuration of the shared resource from the different node.

In some examples, the method may also include receiving a different notification indicating that the node previously selected to execute the application has finished updating the read-write configuration of the shared resource. In such examples, the method may further include importing an updated read-only configuration of the shared resource to the different node in response to receiving the different notification.

In some examples, the method may also include allocating at least a portion of the shared resource to store data that represents a configuration status indicating whether the node previously selected to execute the application is currently updating the read-write configuration of the shared resource. In such examples, the method may further include checking the configuration status prior to determining that the different node has been selected to execute the application and determining, based at least in part on the configuration status, that the node is currently updating the read-write configuration of the shared resource. In addition, the method may include invalidating the different node's read-only configuration of the shared resource in response to determining that the node is currently updating the read-write configuration of the shared resource.

In some examples, the method may also include checking the configuration status after invalidating the different node's read-only configuration of the shared resource and determining, based at least in part on the configuration status, that the node is no longer updating the read-write configuration of the shared resource. In such examples, the method may further include importing an updated read-only configuration of the shared resource to the different node in response to determining that the node is no longer updating the read-write configuration of the shared resource. In addition, the method may include registering the shared resource with the different node.

In some examples, the method may also include determining that the node previously selected to execute the application experienced a system failure preventing the node from continuing to execute the application. In such examples, the method may further include preventing the node from performing input/output operations on the shared resource in response to determining that the node experienced the system failure.

In some examples, the method may also include identifying cluster software installed on the computer cluster that controls which of the nodes is to execute the application. In such examples, the method may further include receiving a notification from the cluster software that indicates that (1) the node previously selected to execute the application is no longer executing the application and (2) the different node has been selected to execute the application.

In some examples, the method may also include allocating at least a portion of the shared resource to store data that identifies a current configuration of the shared resource. In such examples, the method may further include accessing the data that identifies the current configuration of the shared resource prior to converting the different node's read-only configuration of the shared resource to the read-write configuration of the shared resource. In addition, the method may include comparing the different node's read-only configuration of the shared resource with the current configuration of the shared resource and then determining, based at least in part on this comparison, whether the different node's read-only configuration of the shared resource is substantially similar to the current configuration of the shared resource.

In some examples, the method may also include confirming that the different node's read-only configuration of the shared resource is substantially similar to the current configuration of the shared resource. In such examples, the method may further include importing an updated read-only configuration of the shared resource to the different node in response to determining that the different node's read-only configuration of the shared resource is not substantially similar to the current configuration of the shared resource.

In one embodiment, a system for implementing the above-described method may include (1) an identification module programmed to (a) identify a computer cluster that includes (i) a plurality of nodes configured to provide substantially continuous availability of at least one application and (ii) at least one shared resource configured to store data associated with the application, (b) identify at least one node that has been selected to execute the application, and (c) identify at least one different node that has not yet been selected to execute the application, (2) an importation module programmed to (a) import a read-write configuration of the shared resource to the node selected to execute the application to enable the node to read from and write to the shared resource and (b) import a read-only configuration of the shared resource to the different node to enable the different node to read from but not write to the shared resource, (3) a configuration module programmed to (a) determine, after the read-only configuration of the shared resource has been imported to the different node, that the different node has been selected to execute the application and (b) convert, in response to this determination, the different node's read-only configuration of the shared resource to the read-write configuration of the shared resource instead of having the read-write configuration imported to the different node after the different node has been selected to execute the application.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a computer cluster that includes (a) a plurality of nodes configured to provide substantially continuous availability of at least one application and (b) at least one shared resource configured to store data associated with the application, (2) identify at least one node that has been selected to execute the application, (3) identify at least one different node that has not yet been selected to execute the application, (4) import a read-write configuration of the shared resource to the node selected to execute the application to enable the node to read from and write to the shared resource, (5) import a read-only configuration of the shared resource to the different node to enable the different node to read from but not write to the shared resource, (6) determine, after importing the read-only configuration of the shared resource to the different node, that the different node has been selected to execute the application, and then (7) convert, in response to this determination, the different node's read-only configuration of the shared resource to the read-write configuration of the shared resource instead of importing the read-write configuration to the different node after the different node has been selected to execute the application.

As will be explained in greater detail below, by converting a read-only configuration of at least one shared resource to a read-write configuration of the shared resource, the various systems and methods described herein may enable an application that has failed over from one node to another node to become operational faster than previously achievable via importing such a read-write configuration after failover. As a result, by so converting the read-only configuration to the read-write configuration instead of importing the read-write configuration after failover, these systems and methods may facilitate eliminating (or at least further reducing) application downtime.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary read-write configuration and an exemplary read-only configuration.

Figure 1:
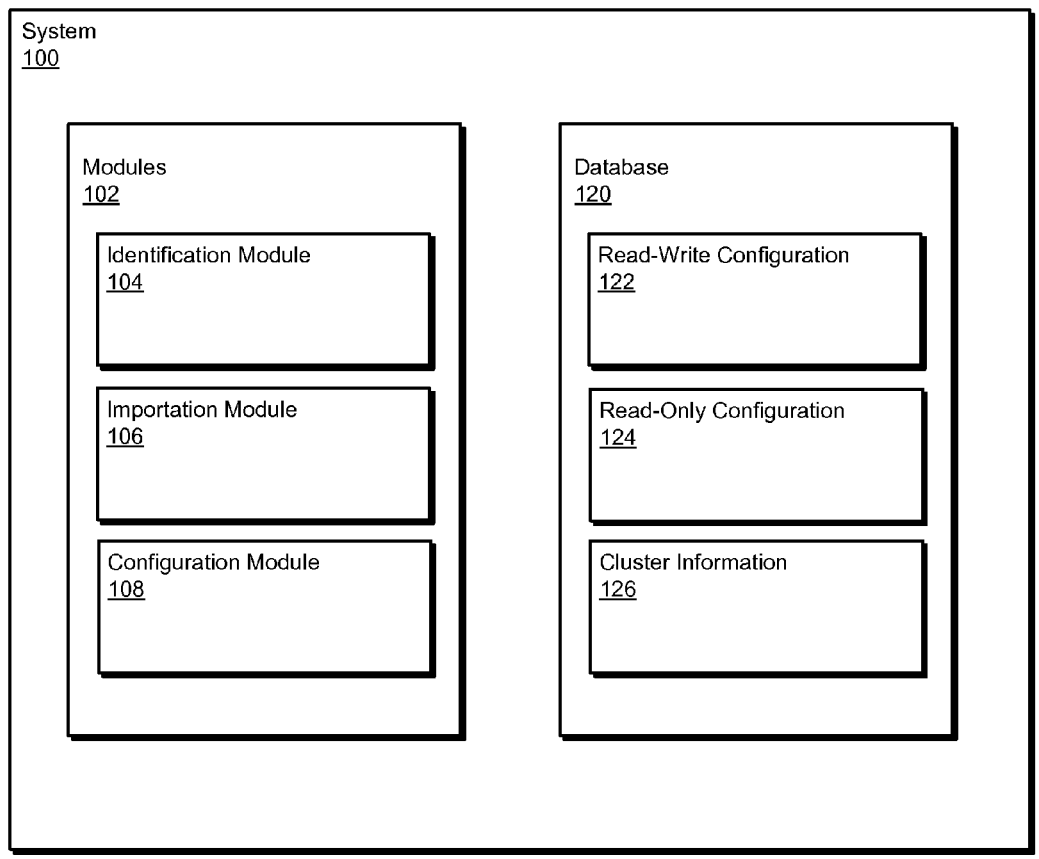
FIG. 1 is a block diagram of an exemplary system for facilitating access to shared resources within computer clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
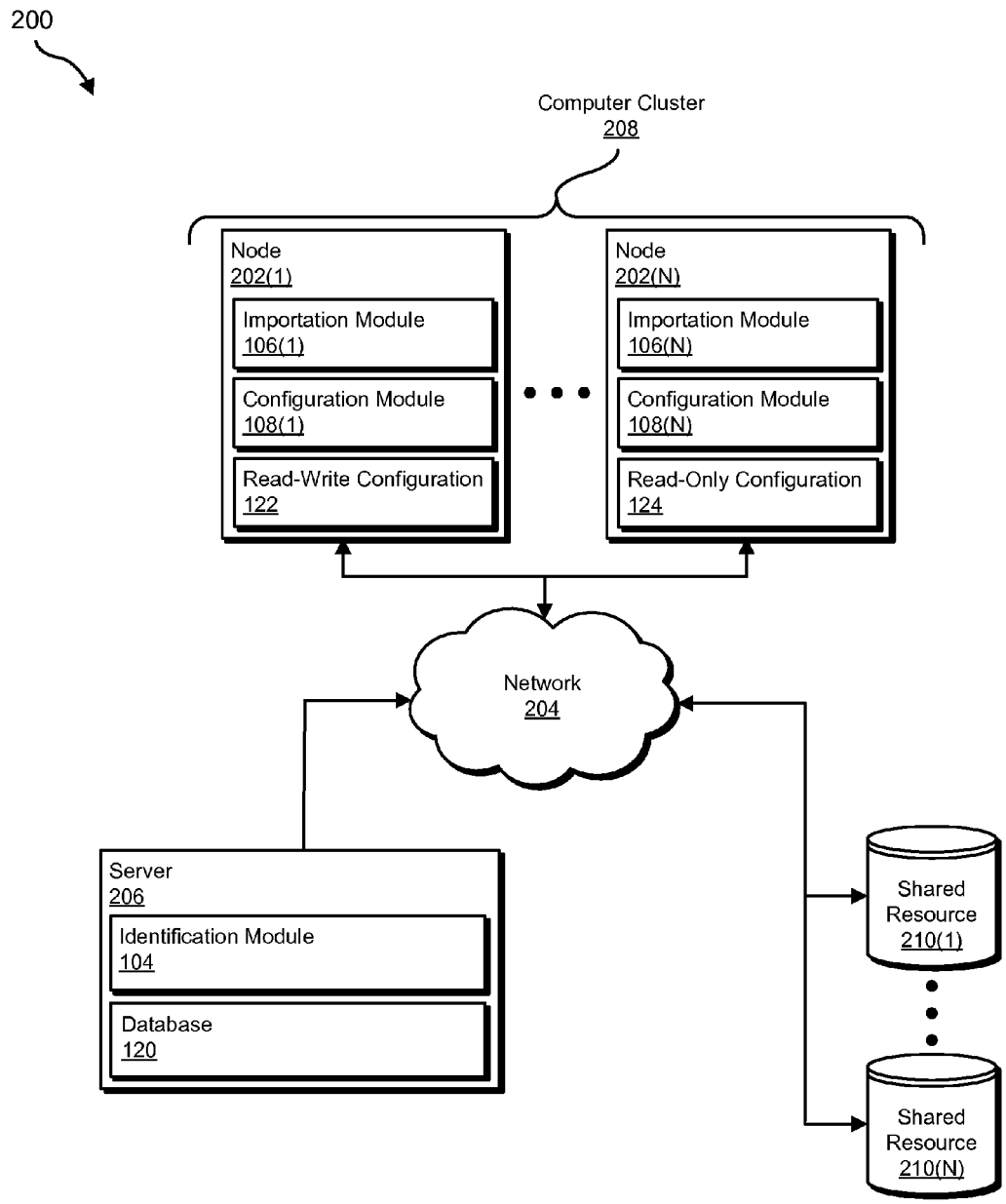
FIG. 2 is a block diagram of an exemplary system for facilitating access to shared resources within computer clusters.

The following will provide, with reference to FIGS. 1-2, detailed descriptions of exemplary systems for facilitating access to shared resources within computer clusters. Detailed descriptions of corresponding computer-implemented methods will also be provided in connection with FIG. 3, and detailed descriptions of an exemplary read-write configuration and an exemplary read-only configuration will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for facilitating access to shared resources within computer clusters. As illustrated in this figure, exemplary system 100 may include one or more modules 102 for performing one or more tasks. For example, and as will be explained in greater detail below, exemplary system 100 may include an identification module 104 programmed to (1) identify a computer cluster that includes (a) a plurality of nodes configured to provide substantially continuous availability of at least one application and (b) at least one shared resource configured to store data associated with the application, (2) identify at least one node that has been selected to execute the application, and (3) identify at least one different node that has not yet been selected to execute the application.

In addition, and as will be described in greater detail below, exemplary system 100 may also include an importation module 106 programmed to (1) import a read-write configuration of the shared resource to the node selected to execute the application to enable the node to read from and write to the shared resource and (2) import a read-only configuration of the shared resource to the different node to enable the different node to read from but not write to the shared resource. Exemplary system 100 may also include a configuration module 108 programmed to (1) determine, after the read-only configuration of the shared resource has been imported to the different node, that the different node has been selected to execute the application and (2) convert, in response to this determination, the different node's read-only configuration of the shared resource to the read-write configuration of the shared resource instead of having the read-write configuration imported to the different node after the different node has been selected to execute the application. Although illustrated as separate elements, one or more of modules 102 in FIG. 1 may represent portions of a single module or application (such as SYMANTEC'S VERITAS VOLUME MANAGER).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store any type or form of information associated with a computer cluster. For example, database 120 may be configured to store (1) a read-write configuration 122 capable of enabling at least one node within the computer cluster to read from and write to at least one shared resource, (2) a read-only configuration 124 capable of enabling at least one node within the computer cluster to read from but not write the shared resource, and/or (3) cluster information 126 that identifies the configuration of the computer cluster and the node within the computer cluster that is currently executing the application.

Database 120 may represent portions of a single database or computing device or a plurality of databases or computing devices. For example, database 120 may represent a portion of one or more of nodes 202(1)-(N) and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as one or more of nodes 202(1)-(N) and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may represent a computer cluster 208 that includes nodes 202(1)-(N) in communication with a server 206 via a network 204. In addition, system 200 may include shared resources 210(1)-(N) accessible to one or more of nodes 202(1)-(N) and/or server 206 via network 204.

In one embodiment, one or more of modules 102 from FIG. 1 may, when executed by at least one processor of a computing device, enable the computing device to facilitate access to shared resources within computer clusters. For example, and as will be described in greater detail below, one or more of modules 102 may cause one or more of nodes 202(1)-(N) and/or server 206 to (1) identify computer cluster 208 that includes (a) nodes 202(1)-(N) configured to provide substantially continuous availability of at least one application and (b) shared resources 210(1)-(N) configured to store data associated with the application, (2) identify at least one of nodes 202(1)-(N) that has been selected to execute the application, (3) identify at least one different node within nodes 202(1)-(N) that has not yet been selected to execute the application, (4) import read-write configuration 122 to the node selected to execute the application to enable the node to read from and write to shared resources 210(1)-(N), (5) import read-only configuration 124 to the different node to enable the different node to read from but not write to shared resources 210(1)-(N), (6) determine, after importing read-only configuration 124 to the different node, that the different node has been selected to execute the application, and then (7) convert, in response to this determination, read-only configuration 124 to read-write configuration 122 instead of importing read-write configuration 122 to the different node after the different node has been selected to execute the application.

Nodes 202(1)-(N) generally represent any type or form of computing device capable of reading computer-executable instructions. Examples of nodes 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable nodes.

Computer cluster 208 generally represents a group of two or more nodes (e.g., nodes 202(1)-(N)) capable of communicating with one another to collectively perform one or more tasks, such as collectively providing high availability of at least one application and/or collectively executing at least one application. Examples of computer cluster 208 include, without limitation, high-availability clusters, load-balancing clusters, Beowolf clusters, high-performance computing clusters, or any other suitable computer clusters. In addition, computer cluster 208 may also include one or more shared resources (e.g., shared resources 210(1)-(N)) configured to store data associated with the application.

Server 206 generally represents any type or form of computing device capable of managing and/or interfacing with nodes and/or shared resources within computer clusters. Examples of server 206 include, without limitation, application servers, web servers, and database servers configured to provide various web and/or database services and/or run certain software applications.

Shared resources 210(1)-(N) generally represent any type or form of physical storage device or virtual storage environment capable of communicating with nodes 202(1)-(N) via network 204. Examples of shared resources 210(1)-(N) include, without limitation, storage arrays, disk storage devices, disk array controllers, physical volumes, physical volume groups, physical extents, logical volumes, logical volume groups, logical extents, mirrored volumes, computing devices, application servers, database servers, or any other suitable shared resources. In addition, shared resources 210(1)-(N) may be managed by and/or interface with a logical volume manager (such as SYMANTEC'S VERITAS VOLUME MANAGER).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In addition, network 204 may facilitate communication between nodes 202(1)-(N), server 206, and/or shared resources 210(1)-(N).

Figure 3:
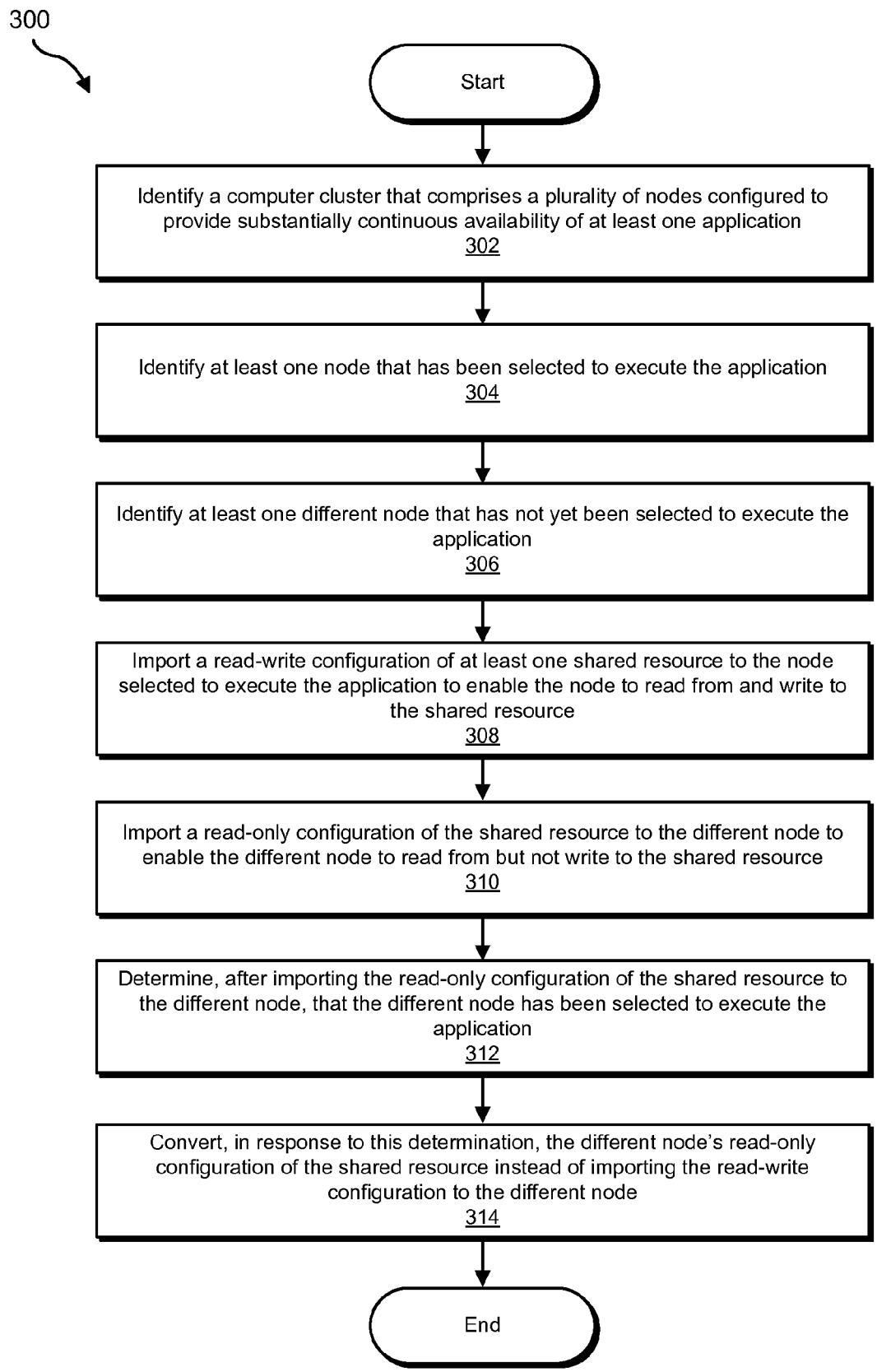
FIG. 3 is a flow diagram of an exemplary method for facilitating access to shared resources within computer clusters.

FIG. 3 is a flow diagram of an exemplary computer-implemented method 300 for facilitating access to shared resources within computer clusters. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the various systems described herein may identify a computer cluster that includes a plurality of nodes configured to provide substantially continuous availability of at least one application. For example, identification module 104 may, as part of server 206, identify computer cluster 208 as including (1) nodes 202(1)-(N) configured to provide substantially continuous availability of at least one application and (2) shared resources 210(1)-(N) configured to store data associated with the application. In this example, each of nodes 202(1)-(N) may be individually capable of accessing the data stored in shared resources 210(1)-(N) and using this data to execute the application.

The systems described herein may perform step 302 in a variety of ways. In some examples, identification module 104 may identify computer cluster 208 by accessing information that identifies nodes 202(1)-(N) and shared resources 210(1)-(N) as part of computer cluster 208. For example, identification module 104 may access database 120 to analyze cluster information 126. In this example, cluster information 126 may identify each of nodes 202(1)-(N) and/or shared resources 210(1)-(N) included in computer cluster 208 by an identification address (such as an IP address or a MAC address), a physical or virtual location, and/or a registration key. Upon analyzing cluster information 126, identification module 104 may determine that computer cluster 208 includes nodes 202(1)-(N) and/or shared resources 210(1)-(N).

In some examples, identification module 104 may identify computer cluster 208 by receiving a notification from each of nodes 202(1)-(N) and/or shared resources 210(1)-(N). For example, nodes 202(1)-(N) and/or shared resources 210(1)-(N) may each send a notification to identification module 104 to indicate that nodes 202(1)-(N) have been configured to provide substantially continuous availability of the application by using the data stored in shared resources 210(1)-(N). In this example, nodes 202(1)-(N) and/or shared resources 210(1)-(N) may each send the notification as part of a boot-up process (initiated, e.g., when nodes 202(1)-(N) and/or shared resources 210(1)-(N) are powered on by a user). Identification module 104 may receive each notification from nodes 202(1)-(N) and/or shared resources 210(1)-(N) and then determine, based at least in part on each received notification, that computer cluster 208 includes nodes 202(1)-(N) and/or shared resources 210(1)-(N).

In some examples, identification module 104 may probe nodes 202(1)-(N) and/or shared resources 210(1)-(N) via network 204 to determine the configuration of computer cluster 208. For example, identification module 104 may send a request for identification to each of nodes 202(1)-(N) and/or shared resources 210(1)-(N). In this example, in response to receiving the request for identification, each of nodes 202(1)-(N) and/or shared resources 210(1)-(N) may send information to identification module 104 that identifies the sending device as part of computer cluster 208. Identification module 104 may receive this information from nodes 202(1)-(N) and/or shared resources 210(1)-(N) and then determine, based at least in part on this received information, that the computer cluster 208 includes nodes 202(1)-(N) and/or shared resources 210(1)-(N).

Returning to FIG. 3, at step 304 the various systems described herein may identify at least one node that has been selected to execute the application. For example, identification module 104 may, as part of server 206, identify node 202(1) as the node currently selected to execute the application within computer cluster 208. In this example, node 202(1) may represent the only node currently selected to execute the application within computer cluster 208.

The systems described herein may perform step 304 in a variety of ways. In some examples, identification module 104 may determine that node 202(1) is currently executing the application by accessing information that indicates that node 202(1) is currently executing the application. For example, and as described above, identification module 104 may access database 120 to analyze cluster information 126. In this example, cluster information 126 may indicate that node 202(1) is currently executing the application within computer cluster 208. Upon analyzing cluster information 126, identification module 104 may determine that node 202(1) is currently executing the application within computer cluster 208.

In some examples, identification module 104 may probe nodes 202(1)-(N) via network 204 to determine which of nodes 202(1)-(N) is currently executing the application. For example, identification module 104 may send a request for information to each of nodes 202(1)-(N). In this example, in response to receiving the request for information, each of nodes 202(1)-(N) may send information to identification module 104 that identifies whether the sending node is currently executing the application. Identification module 104 may receive this information from nodes 202(1)-(N) and then determine, based at least in part on this received information, that node 202(1) is currently executing the application.

Returning to FIG. 3, at step 306 the various systems described herein may identify at least one different node that has not yet been selected to execute the application. For example, identification module 104 may, as part of server 206, identify node 202(N) as a node that has not yet been selected to execute the application within computer cluster 208. In this example, node 202(N) may represent a failover node capable of executing the application in the event that node 202(1) is no longer healthy enough to continue executing the application.

The systems described herein may perform step 306 in a variety of ways. In some examples, identification module 104 may determine that node 202(N) is not currently executing the application. For example, and as described above, identification module 104 may access database 120 to analyze cluster information 126. In this example, cluster information 126 may indicate that node 202(N) is not currently executing the application. Upon analyzing cluster information 126, identification module 104 may determine that node 202(N) is not currently executing the application within computer cluster 208.

In some examples, identification module 104 may probe nodes 202(1)-(N) via network 204 to determine which of nodes 202(1)-(N) is currently executing the application. For example, and as described above, identification module 104 may send a request for information to each of nodes 202(1)-(N). In this example, in response to receiving the request for information, each of nodes 202(1)-(N) may send information to identification module 104 that indicates whether the sending node is currently executing the application. Identification module 104 may receive this information from nodes 202(1)-(N) and then determine, based at least in part on this received information, that node 202(N) is not currently executing the application.

Returning to FIG. 3, at step 308 the various systems described herein may import a read-write configuration of the shared resources to the node selected to execute the application to enable the node to read from and write to the shared resources. For example, importation module 106(1) may, as part of node 202(1), import a read-write configuration 122 to enable node 202(1) to read from and write to shared resources 210(1)-(N). In this example, read-write configuration 122 may identify one or more portions (e.g., one or more physical volumes, physical volume groups, physical extents, logical volumes, logical volume groups, and/or logical extents) of shared resources 210(1)-(N) configured to store data associated with the application.

The systems described herein may perform step 308 in a variety of ways. In one example, importation module 106(1) may access database 120 located on server 206 to obtain read-write configuration 122. For example, cluster software (e.g., SYMANTEC'S VERITAS CLUSTER SERVER) installed on computer cluster 208 may select node 202(1) to execute the application. In this example, in response to the selection of node 202(1), importation module 106(1) may access database 120 located on server 206 to obtain read-write configuration 122 via network 204.

In another example, in response to the selection of node 202(1), server 206 may access database 120 to obtain read-write configuration 122. In this example, upon obtaining read-write configuration 122, server 206 may send read-write configuration 122 to importation module 106(1) via network 204 to enable node 202(1) to read from and write to shared resources 210(1)-(N). Importation module 106(1) may receive read-write configuration 122 from server 206 and then enable node 202(1) to use read-write configuration 122 to read from and write to shared resources 210(1)-(N).

As illustrated in FIG. 4, read-write configuration 122 may include various information used to enable node 202(1) to read from and write to shared resources 210(1)-(N), such as the type of computer cluster (in this example, "HIGH AVAILABILITY"), the nodes included in the computer cluster (in this example, "NODES 202(1)-(N)"), the application running on the computer cluster (in this example, "APPLICATION 1"), the node currently executing the application (in this example, "NODE 202(1)"), the shared resources used by the application (in this example, "SHARED RESOURCES 210(1)-(N)"), and the type of accessibility to the shared resources (in this example, "READ/WRITE").

In some examples, upon importing read-write configuration 122 to node 202(1), importation module 106(1) may register shared resources 210(1)-(N) with node 202(1). In one example, importation module 106(1) may register an identification address (such as an IP address or a MAC address) associated with each of shared resources 210(1)-(N). In another example, importation module 106(1) may register one or more physical or virtual locations within shared resources 210(1)-(N) and/or a registration key associated with each of shared resources 210(1)-(N).

Returning to FIG. 3, at step 310 the various systems described herein may import a read-only configuration of the shared resources to the different node to enable the different node to read from but not write to the shared resources. For example, importation module 106(N) may, as part of node 202(N), import read-only configuration 124 to enable node 202(N) to read from but not write to shared resources 210(1)-(N). In this example, read-only configuration 124 of shared resources 210(1)-(N) may identify one or more portions (e.g., one or more physical volumes, physical volume groups, physical extents, logical volumes, logical volume groups, and/or logical extents) of shared resources 210(1)-(N) configured to store data associated with the application.

The systems described herein may perform step 310 in a variety of ways. In one example, importation module 106(N) may access database 120 located on server 206 to obtain read-only configuration 124. For example, and as described above, the cluster software installed on computer cluster 208 may select node 202(1) to execute the application. In this example, in response to the selection of node 202(1), importation module 106(N) may access database 120 located on server 206 to obtain read-only configuration 124 via network 204.

In another example, in response to the selection of node 202(1), server 206 may access database 120 to obtain read-only configuration 124. In this example, upon obtaining read-only configuration 124, server 206 may send read-only configuration 124 to importation module 106(N) to enable node 202(N) to read from but not write to shared resources 210(1)-(N). Importation module 106(N) may receive read-only configuration 124 from server 206 and then enable node 202(N) to use read-only configuration 124 to read from but not write to shared resources 210(1)-(N).

As illustrated in FIG. 4, read-only configuration 124 may include various information used to enable node 202(N) to read from but not write to shared resources 210(1)-(N), such as the type of computer cluster (in this example, "HIGH AVAILABILITY"), the nodes included in the computer cluster (in this example, "NODES 202(1)-(N)"), the application running on the computer cluster (in this example, "APPLICATION 1"), the node currently executing the application (in this example, "NODE 202(1)"), the shared resources used by the application (in this example, "SHARED RESOURCES 210(1)-(N)"), and the type of accessibility to the shared resources (in this example, "READ ONLY").

In some examples, upon importing read-only configuration 124 to node 202(N), importation module 106(N) may register shared resources 210(1)-(N) with node 202(N). In one example, importation module 106(N) may register an identification address (such as an IP address or a MAC address) associated with each of shared resources 210(1)-(N). In another example, importation module 106(1) may register one or more physical or virtual locations within shared resources 210(1)-(N) and/or a registration key associated with each of shared resources 210(1)-(N).

Returning to FIG. 3, at step 312 the various systems described herein may determine that the different node has been selected to execute the application after importing the read-only configuration of the shared resources to the different node. For example, configuration module 108(N) may, as part of node 202(N) (or, alternatively, as part of server 206), determine that node 202(N) has been selected to execute the application. In this example, the cluster software installed on computer cluster 208 may have selected node 202(N) to execute the application after importation module 106(N) imported read-only configuration 124 to node 202(N).

The systems described herein may perform step 312 in a variety of ways. In some examples, configuration module 108(N) may receive a notification indicating that node 202(N) has been selected to execute the application. In one example, the cluster software may detect a system failure preventing node 202(1) from continuing to execute the application. In this example, in response to detecting the system failure in node 202(1), the cluster software may direct the application to fail over from node 202(1) to node 202(N) and then send a notification to configuration module 108(N) to indicate that (1) node 202(1) is no longer executing the application and/or (2) node 202(N) has been selected to execute the application. Configuration module 108(N) may receive this notification from the cluster software and then determine, based at least in part on this received notification, that node 202(N) has been selected to execute the application.

In response to detecting the system failure on node 202(1), the cluster software may also prevent node 202(1) from performing any input/output operations on shared resources 210(1)-(N). For example, prior to detection of the system failure on node 202(1), a CPU located on node 202(1) may be scheduled to perform one or more input/output operations associated with the application. In this example, after detecting the system failure on node 202(1), the cluster software may prevent node 202(1) from performing the input/output operations by removing the input/output operations from a queue configured to deliver instructions to the CPU located on node 202(1).

Additionally or alternatively, configuration module 108(1) may convert read-write configuration 122 to read-only configuration 124 in response to detection of the system failure on node 202(1). For example, configuration module 108(1) may access read-write configuration 122 located on node 202(1) to change the accessibility identified in read-write configuration 122 from "READ ONLY" to "READ/WRITE." In this example, configuration module 108(1) may prevent node 202(1) from performing the input/output operations on shared resources 210(1)-(N) by retracting the node's authorization to execute the application.

By preventing node 202(1) from performing such input/output operations, the cluster software may help ensure that application failover does not lead to data corruption or a "split-brain" scenario in which multiple nodes within computer cluster 208 attempt to individually perform similar or identical computing tasks (such as writing data to and/or reading data from shared resources 210(1)-(N)) without communicating with one another.

In another example, configuration module 108(N) may analyze one or more input/output operations performed by node 202(N) to determine whether node 202(N) is currently executing the application. For example, after node 202(N) has been selected to execute the application, an operating system kernel installed on node 202(N) may perform one or more input/output operations indicating that node 202(N) is currently executing the application. In this example, configuration module 108(N) may analyze such input/output operations and then determine, based at least in part on this analysis, that node 202(N) is currently executing the application.

In some examples, prior to determining that node 202(N) has been selected to execute the application, configuration module 108(N) may determine that node 202(1) is currently updating the configuration of shared resources 210(1)-(N). In one example, configuration module 108(N) may receive a notification indicating that node 202(1) has started updating the configuration of shared resources 210(1)-(N). For example, configuration module 108(1) installed on node 202(1) may move data associated with the application from shared resource 210(N) to a different shared resource (e.g., shared resource 210(1) or another shared resource not illustrated in FIG. 2) such that the application no longer depends on shared resource 210(N) to function properly.

In this example, upon moving such data from shared resource 210(N) to the different shared resource, configuration module 108(1) may send a notification indicating that node 202(1) has started updating the configuration of shared resources 210(1)-(N) to configuration module 108(N). Configuration module 108(N) may receive this notification from configuration module 108(1) and then invalidate read-only configuration 124 in response to receiving this notification.

In one embodiment, configuration module 108(N) may mark read-only configuration 124 as invalid to prevent this version of read-only configuration 124 from being converted to read-write configuration 122 upon application failover. In another embodiment, configuration module 108(N) may delete or remove read-only configuration 124 from node 202(N) to prevent this version of read-only configuration 124 from being converted to read-write configuration 122 upon application failover.

In addition, after invalidating read-only configuration 124, configuration module 108(N) may receive a different notification indicating that node 202(1) has finished updating the configuration of shared resources. For example, upon moving the data associated with the application from shared resource 210(N), configuration module 108(1) may send a notification indicating that node 202(1) has finished updating the configuration of shared resources to configuration module 108(N). In this example, configuration module 108(N) may receive this notification from configuration module 108(1) and then prompt importation module 106(N) to import an updated version of read-only configuration 124 to node 202(N).

In another example, configuration module 108(1) may allocate at least a portion (e.g., a data segment) of shared resources 210(1)-(N) to store data that represents a configuration status. For example, configuration module 108(1) may allocate a byte of data located at address "0xA2F1B920" of shared storage 210(1) to represent the configuration status. In this example, the configuration status may indicate whether node 202(1) is currently updating the configuration of shared resources 210(1)-(N).

In one example, configuration module 108(N) may check the configuration status to determine whether node 202(1) is currently updating the configuration of shared resources 210 (1)-(N). In this example, configuration module 108(N) may determine that node 202(1) is currently updating the configuration of shared resources 210(1)-(N) based at least in part on the configuration status. Configuration module 108(N) may then invalidate read-only configuration 124 in response to determining that node 202(1) is currently updating the configuration of shared resources 210(1)-(N).

In one example, configuration module 108(N) may check the configuration status prior to determining that node 202(N) has been selected to execute the application. For example, configuration module 108(1) may be configured to check the configuration status at periodic time intervals. In another example, configuration module 108(N) may check the configuration status in response to determining that node 202(N) has been selected to execute the application.

In some examples, after invalidating read-only configuration 124, configuration module 108(1) may check the configuration status again to determine whether node 202(1) is still updating the configuration of shared resources 210(1)-(N). For example, configuration module 108(N) may check the configuration status and determine, based at least in part on this check, that node 202(1) is no longer updating the configuration of shared resources 210(1)-(N). Configuration module 108(N) may then import an updated version of read-only configuration 124 to node 202(N) in response to this determination.

Returning to FIG. 3, at step 314 the various systems described herein may convert the different node's read-only configuration of the shared resources to the read-write configuration of the shared resources in response to determining that the different node has been selected to execute the application. For example, configuration module 108(N) may, as part of node 202(N) (or, alternatively, as part of server 206), convert read-only configuration 124 to read-write configuration 122 instead of importing read-write configuration 122 to node 202(N) after node 202(N) has been selected to execute the application. In this example, by converting read-only configuration 124 to read-write configuration 122, configuration module 108(N) may enable the application to function properly on node 202(N) upon execution.

The systems described herein may perform step 314 in a variety of ways. In some examples, configuration module 108(N) may be configured to automatically convert read-only configuration 124 to read-write configuration 122 in response to determining that node 202(N) has been selected to execute the application. For example, configuration module 108(N) may access read-only configuration 124 located on node 202 (N) to change the accessibility identified in read-only configuration 124 from "READ ONLY" to "READ/WRITE." In this example, configuration module 108(N) may enable node 202(N) to read from and write to shared resources 210(1)-(N) without having to import read-write configuration 122 after node 202(N) has been selected to execute the application.

In some examples, configuration module 108(1) may allocate at least a portion (e.g., a data segment) of shared resources 210(1)-(N) to store data that identifies a current configuration of shared resources 210(1)-(N). In one example, configuration module 108(N) may access such data stored in this portion of shared resources 210(1)-(N) prior to converting read-only configuration 124 to read-write configuration 122. In this example, configuration module 108(N) may compare read-only configuration 124 with the current configuration and then determine, based at least in part on this comparison, whether the read-only configuration 124 is substantially similar to the current configuration.

In one example, configuration module 108(N) may confirm that read-only configuration 124 is substantially similar to the current configuration of shared resources 210(1)-(N) and then start converting read-only configuration 124 to read-write configuration 122 in response to this confirmation. In another example, configuration module 108(N) may determine that read-only configuration 124 is not substantially similar to the current configuration of shared resources 210(1)-(N) and then import an updated version of read-only configuration 124 to node 202(N) in response to this determination.

As explained above, by converting a read-only configuration of at least one shared resource to a read-write configuration of the shared resource, the various systems and methods described herein may enable an application that has failed over from one node to another node to become operational faster than previously achievable via importing such a read-write configuration after failover. As a result, by so converting the read-only configuration to the read-write configuration instead of importing the read-write configuration after failover, these systems and methods may facilitate eliminating (or at least further reducing) application downtime.

Figure 5:
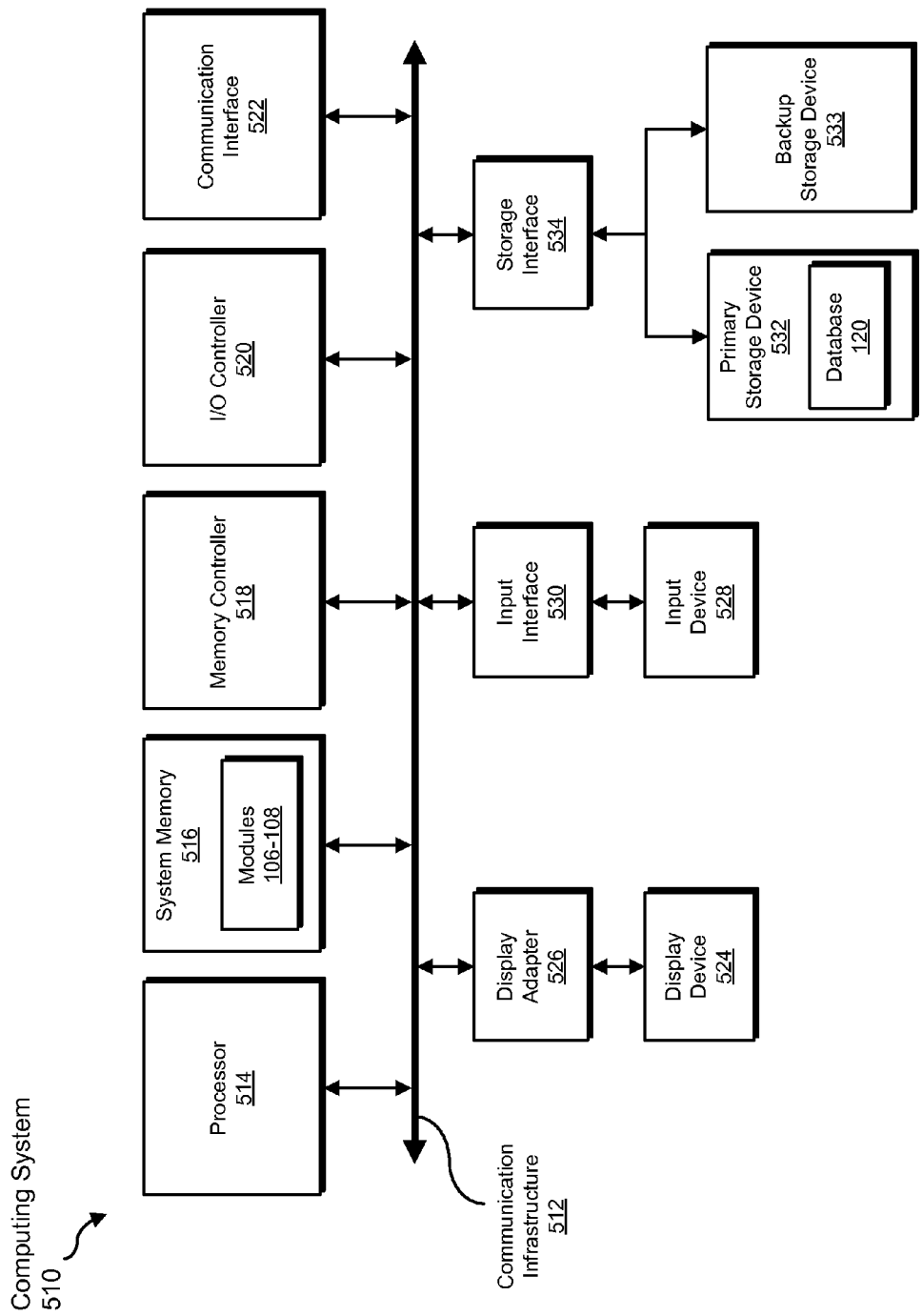
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, importing, determining, converting, receiving, invalidating, removing, allocating, checking, registering, preventing, accessing, comparing, and confirming steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
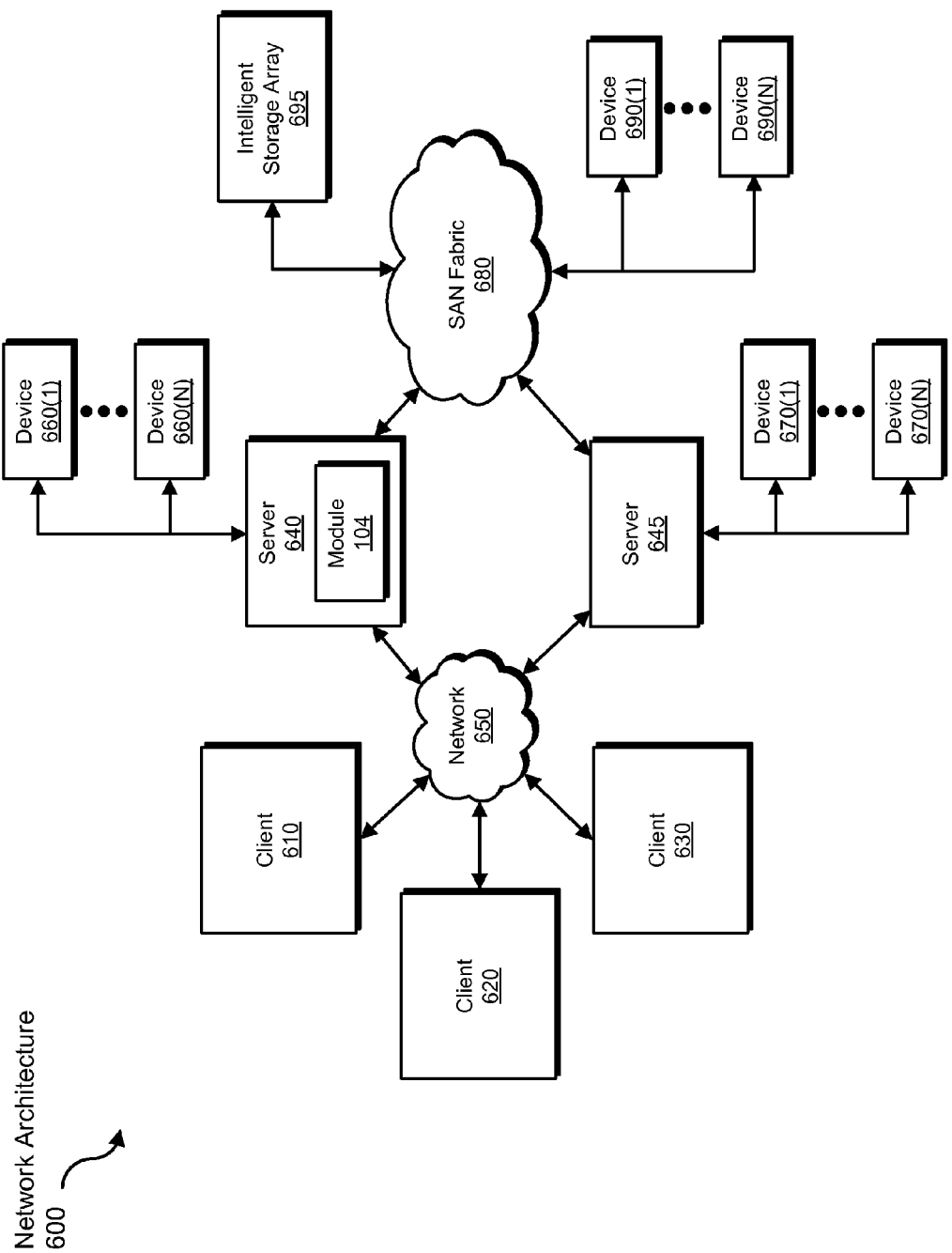
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, importing, determining, converting, receiving, invalidating, removing, allocating, checking, registering, preventing, accessing, comparing, and confirming steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for facilitating access to shared resources within computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a characteristic or property of one or more physical devices (such as one or more of nodes 202(1)-(N) and/or server 206 in FIG. 2) by facilitating access to shared resources (such as shared resources 210(1)-(N)) within computer clusters.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating access to shared resources within computer clusters, at least a portion of the method being performed by at least one computing device comprising at least one hardware processor, the method comprising:
    identifying a computer cluster that comprises:
        a plurality of nodes configured to provide substantially continuous availability of at least one application;
        at least one shared resource configured to store data associated with the application;
    identifying at least one node that has been selected to execute the application;
    identifying at least one different node that has not yet been selected to execute the application, the different node comprising at least one hardware processor;
    importing a read-write configuration of the shared resource to the node selected to execute the application to enable the node to read from and write to the shared resource;
    importing, by the different node, a read-only configuration of the shared resource to the different node to enable the different node to read from but not write to the shared resource;
    after importing the read-only configuration of the shared resource to the different node, determining, by the different node, that the different node has been selected to execute the application;
    in response to determining that the different node has been selected to execute the application, converting, by the different node, the different node's read-only configuration of the shared resource to the read-write configuration of the shared resource instead of importing the read-write configuration to the different node after the different node has been selected to execute the application.

2. The method of claim 1, further comprising:
    prior to determining that the different node has been selected to execute the application, receiving a notification indicating that the node previously selected to execute the application has started updating the read-write configuration of the shared resource;
    in response to receiving the notification, invalidating the different node's read-only configuration of the shared resource.

3. The method of claim 2, further comprising:
    after invalidating the different node's read-only configuration of the shared resource, receiving a different notification indicating that the node previously selected to execute the application has finished updating the read-write configuration of the shared resource;
    in response to receiving the different notification, importing an updated read-only configuration of the shared resource to the different node.

4. The method of claim 2, wherein invalidating the different node's read-only configuration of the shared resource comprises removing the read-only configuration of the shared resource from the different node.

5. The method of claim 1, further comprising allocating at least a portion of the shared resource to store data that represents a configuration status indicating whether the node previously selected to execute the application is currently updating the read-write configuration of the shared resource.

6. The method of claim 5, further comprising:
    prior to determining that the different node has been selected to execute the application, checking the configuration status indicating whether the node previously selected to execute the application is currently updating the read-write configuration of the shared resource;
    determining, based at least in part on the configuration status, that the node is currently updating the read-write configuration of the shared resource;
    in response to determining that the node is currently updating the read-write configuration of the shared resource, invalidating the different node's read-only configuration of the shared resource.

7. The method of claim 6, further comprising:
    after invalidating the different node's read-only configuration of the shared resource, checking the configuration status indicating whether the node previously selected to execute the application is currently updating the read-write configuration of the shared resource;
    determining, based at least in part on the configuration status, that the node is no longer updating the read-write configuration of the shared resource;
    in response to determining that the node is no longer updating the read-write configuration of the shared resource, importing an updated read-only configuration of the shared resource to the different node.

8. The method of claim 1, wherein importing the read-only configuration of the shared resource to the different node comprises registering the shared resource with the different node.

9. The method of claim 1, wherein determining that the different node has been selected to execute the application comprises:
    determining that the node previously selected to execute the application experienced a system failure preventing the node from continuing to execute the application;
    in response to determining that the node experienced the system failure, preventing the node from performing input/output operations on the shared resource.

10. The method of claim 1, wherein determining that the different node has been selected to execute the application comprises:
- identifying cluster software installed on the computer cluster that controls which of the nodes is to execute the application;
- receiving a notification from the cluster software that indicates that:
  - the node previously selected to execute the application is no longer executing the application;
  - the different node has been selected to execute the application.

11. The method of claim 1, further comprising allocating at least a portion of the shared resource to store data that identifies a current configuration of the shared resource.

12. The method of claim 11, further comprising, prior to converting the different node's read-only configuration of the shared resource to the read-write configuration of the shared resource:
- accessing the data that identifies the current configuration of the shared resource;
- comparing the different node's read-only configuration of the shared resource with the current configuration of the shared resource;
- determining, based at least in part on the comparison, whether the different node's read-only configuration of the shared resource is substantially similar to the current configuration of the shared resource.

13. The method of claim 12, wherein determining whether the different node's read-only configuration of the shared resource is substantially similar to the current configuration of the shared resource comprises at least one of:
- confirming that the different node's read-only configuration of the shared resource is substantially similar to the current configuration of the shared resource;
- in response to determining that the different node's read-only configuration of the shared resource is not substantially similar to the current configuration of the shared resource, importing an updated read-only configuration of the shared resource to the different node.

14. A system for facilitating access to shared resources within computer clusters, the system comprising:
- an identification module, stored in memory, that:
  - identifies a computer cluster that comprises:
    - a plurality of nodes configured to provide substantially continuous availability of at least one application;
    - at least one shared resource configured to store data associated with the application;
  - identifies at least one node that has been selected to execute the application;
  - identifies at least one different node that has not yet been selected to execute the application;
- an importation module, stored in memory, that:
  - imports a read-write configuration of the shared resource to the node selected to execute the application to enable the node to read from and write to the shared resource;
  - imports a read-only configuration of the shared resource to the different node to enable the different node to read from but not write to the shared resource;
- a configuration module, stored in memory, that:
  - determines, after the read-only configuration of the shared resource has been imported to the different node, that the different node has been selected to execute the application;
  - converts, in response to determining that the different node has been selected to execute the application, the different node's read-only configuration of the shared resource to the read-write configuration of the shared resource instead of having the read-write configuration imported to the different node after the different node has been selected to execute the application;
- at least one hardware processor that executes the identification module, the importation module, and the configuration module.

15. The system of claim 14, wherein the configuration module further:
- receives, prior to determining that the different node has been selected to execute the application, a notification indicating that the node previously selected to execute the application has started updating the read-write configuration of the shared resource;
- invalidates the different node's read-only configuration of the shared resource in response to receiving the notification.

16. The system of claim 15, wherein:
- the configuration module further receives, after invalidating the different node's read-only configuration of the shared resource, a different notification indicating that the node previously selected to execute the application has finished updating the read-write configuration of the shared resource;
- the importation module further imports an updated read-only configuration of the shared resource to the different node in response to the different notification.

17. The system of claim 14, wherein the configuration module further removes the read-only configuration of the shared resource from the different node.

18. The system of claim 14, wherein the importation module further registers the shared resource with the different node.

19. The system of claim 14, wherein the configuration module-further:
- determines that the node previously selected to execute the application experienced a system failure preventing the node from continuing to execute the application;
- prevents the node from performing input/output operations on the shared resource in response to determining that the node experienced the system failure.

20. A non-transitory computer-readable-storage medium comprising one or more computer-executable instructions that, when executed by at least one processor of a computing device, cause the computing device to:
- identify a computer cluster that comprises:
  - a plurality of nodes configured to provide substantially continuous availability of at least one application;
  - at least one shared resource configured to store data associated with the application;
- identify at least one node that has been selected to execute the application;
- identify at least one different node that has not yet been selected to execute the application;
- import a read-write configuration of the shared resource to the node selected to execute the application to enable the node to read from and write to the shared resource;
- import a read-only configuration of the shared resource to the different node to enable the different node to read from but not write to the shared resource;
- determine, after importing the read-only configuration of the shared resource to the different node, that the different node has been selected to execute the application;

convert, in response to determining that the different node has been selected to execute the application, the different node's read-only configuration of the shared resource to the read-write configuration of the shared resource instead of importing the read-write configuration to the different node after the different node has been selected to execute the application.

* * * * *

UNITED STATES PATENT AND TRADEMARK OFFICE
CERTIFICATE OF CORRECTION

PATENT NO. : 9,077,579 B1
APPLICATION NO. : 13/397255
DATED : July 7, 2015
INVENTOR(S) : Jiang-Hsing Chu et al.

Page 1 of 1

It is certified that error appears in the above-identified patent and that said Letters Patent is hereby corrected as shown below:

In The Claims

Claim 19, at column 22, lines 37 to 38, should read:
The system of claim 14, wherein the configuration module further:

Signed and Sealed this
Twenty-third Day of February, 2016

Michelle K. Lee
*Director of the United States Patent and Trademark Office*